United States Patent [19]

Baron

[11] 4,176,588

[45] Dec. 4, 1979

[54] BREWING APPARATUS

[76] Inventor: Barnett Baron, 1009 Meridian Ave., Apt. 19, Miami Beach, Fla. 33139

[21] Appl. No.: 929,919

[22] Filed: Aug. 1, 1978

[51] Int. Cl.² .............................................. A47J 31/06
[52] U.S. Cl. ..................................... 99/323; 210/469; 210/474
[58] Field of Search ................. 99/279, 295, 306, 316, 99/317, 318, 321, 322, 323; 210/469, 474, 482; 426/77, 81

[56] References Cited

U.S. PATENT DOCUMENTS

| | | | |
|---|---|---|---|
| 1,560,471 | 11/1925 | Horne | 210/482 |
| 2,716,937 | 9/1955 | Milano | 99/306 |
| 2,743,664 | 5/1956 | Dale | 210/482 |
| 2,885,290 | 5/1959 | Krasker | 99/306 |
| 3,695,167 | 10/1972 | Schmidt | 99/306 |
| 4,022,257 | 5/1977 | O'Connell | 210/474 |

*Primary Examiner*—Robert W. Jenkins

[57] ABSTRACT

A brewing apparatus including a cup and a pair of rings sized to telescope with respect to one another and sized to telescope as a combination over the lower end of the cup; each of the rings has a shoulder to mate with one another when in telescoping relation with one another, the shoulders of each being adjacent one end for captivating a filter paper between the rings in spanning relation thereof which filter paper is adapted to be formed and shaped about the exterior of the cup to generally match the configuration and size of the cup, so that, after the rings and the form and shaped paper captivated by them are removed from the exterior of the cup, and inserted into the cup with the filter paper depending within the cup, there is a brewing chamber formed, each of the rings may include a radially outwardly extending portion to engage the mouth of the cup to limit penetration of the formed filter within the cup during the brewing operation; and the exterior of the cup is provided with an abutment surface to position the rings while in telescopic relation with one another and in telescopic relation with the exterior of the cup.

11 Claims, 3 Drawing Figures

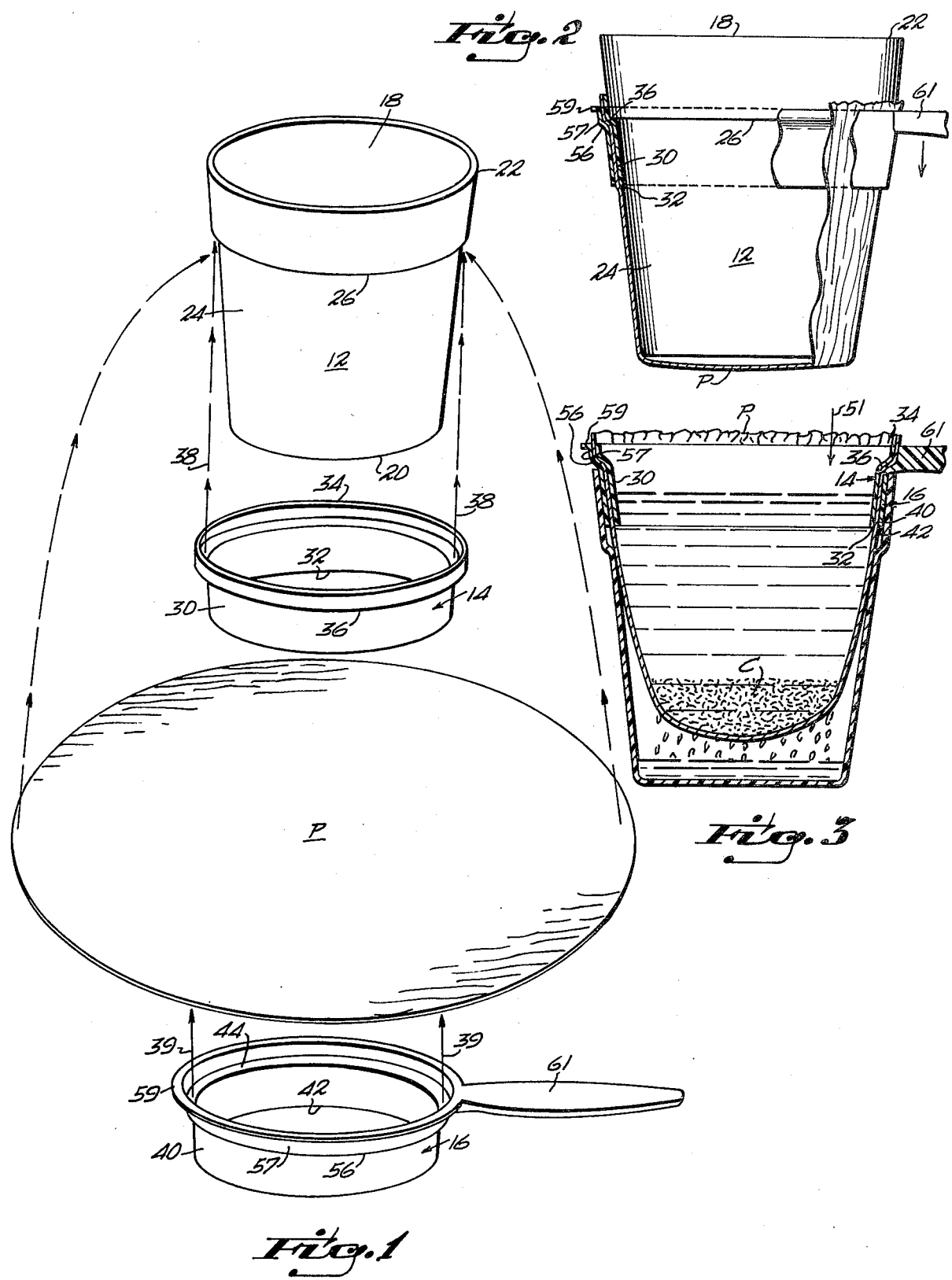

BREWING APPARATUS

FIELD OF THE INVENTION

This invention relates to brewing apparatus and a method for brewing coffee or the like using the same, and which is particularly adapted for use by Senior Citizens in brewing small amounts.

BACKGROUND OF THE INVENTION

As is perhaps well known, many Senior Citizens are required by various circumstances to live alone and often want to brew a single cup of coffee, boullion, or the like. This is quite difficult to do without rather expensive apparatus and attendant waste. This invention is of a brewing apparatus which is composed of a single cup and a pair of matching brewing rings for telescopic engagement with one another to captivate a filter paper between them so that the same may be formed as described more fully hereinafter, using a mating cup as a form and, thereafter, the rings together with the formed filter are adapted to be removed from the exterior or the cup and inserted within the cup so that brewing materials may be positioned within the filter and hot water poured into the cup. After this is done, the rings and the shaped or formed paper spanning the rings are removed from the cup and, after the filter is separated from the rings, and the rings from each other, the paper is discarded. The device may thereafter be cleaned and used repeatedly.

OBJECTS OF THE INVENTION

It is, accordingly, an object of this invention to provide a brewing apparatus composed of a cup and a pair of telescoped rings sized for axial movement along the exterior of the cup into abutting relation with a shoulder extending radially outwardly from the cup adjacent the upper end and wherein a filter paper disc is adapted to be captivated between the rings to be formed on the exterior of the cup as a first step and whereby after the filter forming operation, the rings and the captivated formed filter can then be removed in combination, and inserted as a combination within the cup for use in brewing coffee, boullion or the like.

It is another object of this invention to provide a process or method for brewing small quantities of nourishing or enjoyable liquid in small quantities, by Senior Citizens especially which is performed using a cup and two telescoping rings and wherein a filter paper is adapted to be formed over the exterior of the cup and clamped by the two rings in a filter shaping or forming process and, thereafter, the rings and formed filter are removed from the exterior of the cup and this combination is inserted into the cup for brewing a cup of coffee without waste and in small quantities.

In accordance with the foregoing objects and in the light of the specification as described hereinafter, it is a general object of this invention to provide a simple and inexpensive group of components for use in brewing small quantities of coffee and which is simple and inexpensive to use in that waste is reduced and small quantities are adapted to be brewed.

In accordance with these and other objects which will become apparent hereinafter, the instant invention will now be described with reference to the accompanying drawings, in which:

DESCRIPTION OF THE DRAWINGS

FIG. 1 is an exploded perspective view of the components of the instant invention;

FIG. 2 is a view partly in cross section illustrating the first step in the process of utilizing the components of the instant invention for brewing a cup of coffee or the like; and FIG. 3 is a view of the apparatus of the instant invention while brewing a cup of coffee or the like.

DESCRIPTION OF THE PREFERRED EMBODIMENT

Referring to the drawings wherein like reference characters designate like or corresponding parts throughout the several views, there is shown in FIG. 1 a plurality of components making up the instant invention and being composed of a cup 12 and a brewing filter holder composed of an inside ring 14 and an outside ring 16.

Referring to the cup, it is seen that it has an open upper end 18 and a closed lower end 20 with an upper rim 22 being defined about the mouth of the open upper end 18. The cup has side walls 24 which extend upwardly from the lower end or floor 20 to an exterior, radially outwardly extending annular shoulder 26 spaced axially from the rim 22.

Referring now to the inside ring, it includes an annular ring or skirt portion 30 with an open lower end 32 and an upper end 34 which comprises an upper abutment surface or rim. Between the skirt and the upper end rim 34 there is exteriorly provided a radially outwardly extending shoulder 36; and, as indicated by the arrowed lines 38, the ring 14 is adapted to be moved axially over the side walls of the cup until the rim 34 is in abutting engagement with the shoulder 36.

Referring now to the outside ring at the bottom of FIG. 1, it also includes a skirt 40 having a lower end 42 which is open and an upper rim 44 with an axially spaced shoulder 46 being provided on the exterior surface. This outside ring is adapted to telescopingly mate with the inside ring 14 with the rim 44 in abutting engagement with the shoulder 36 of the upper ring.

The use of the above-described components will now be explained, the same being adapted for two distinct steps in the brewing process.

First, the inside ring 14 is moved axially as indicated by the arrowed lines 38 until the upper end or rim or abutment surface 34 is in abutting engagement with the exterior cup shoulder 26. Thereafter, a filter paper P which is preferably disc-shaped as shown in FIG. 1 is positioned about the exterior wall of the cup with the inside ring over the exterior of the cup as previously described. It is then shaped or formed by crushing it so as to conform generally to the configuration of the cup. Thereafter, the outside ring 16 is moved axially in the direction of the arrowed lines 39, see FIG. 1, over the filter paper, which is now on the exterior of the cup, until the rim 44 abuts the shoulder 36 of the inside ring. This captivates the margin of the paper P. Thereafter, the two rings, together with the shaped or formed filter paper captivated therebetween, are removed by axially moving the combination from the cup, i.e., the brewing filter holder composed of the rings and the captivated shaped filter paper, this combination being shown in FIG. 2.

This brewing filter holder and filter paper is then inserted in the direction of the arrowed line 51 into the interior of the cup, as shown in FIG. 3. Thereafter, coffee designated by the numeral C or other substance, may be suspended within it and water poured into the interior of the cup while the filter spans it. After due passage of time, the filter paper and rings, or holder, are then removed in the direction of the arrowed line 53 so that the brewed remains B are in the cup.

In the preferred embodiment, the inside ring 14, see FIG. 1, is provided with an axially extending annular lip 56 to overlay the coffee cup above the shoulder 26; and, similarly, the outside ring 16 is provided with an axially extending annular lip 57 sized to overlay the exterior surface of the inside ring adjacent the shoulder 36. Also, in the preferred embodiment in order to handle the brewing filter holder and filter paper, that is after the filter paper has been shaped and formed and while the rings are mated together and spanned by the filter, an annularly extending flange or holder lift portion 59 is preferably provided on the outside ring 16. In the preferred embodiment illustrated in FIG. 1, a radially outwardly extending handle 61 is also provided.

While the invention has been shown in a preferred embodiment, including a generally tubular or inverted truncated cone-shaped cup, it is recognized that departures may be made in the form of the cup and the mating matching rings to accommodate a square-shaped cup, for example; and it is further recognized that departures may be made from the invention as described within the spirit of this invention which is therefore not to be limited except as set forth in the claims which follow. Also, the exterior shoulder 46 on the outside ring serves as a stop means in this preferred embodiment for the use, see FIG. 3, wherein it abuts the mouth or rim of the cup, which faces the bottom of the filter from the cup bottom; however, this exterior shoulder on the outside ring may be eliminated, if preferred.

What is claimed is:

1. A brewing apparatus comprising:
I. a brewing cup having a mouth rim comprising a first abutment surface, and said rim defining an open upper end, said cup including an annular exterior shoulder extending radially outwardly forming a second annular abutment surface adjacent to and axially spaced from said rim, an annular upper side wall extending from said shoulder to said open upper end, said cup having a closed lower end and an annular lower side wall extending axially from said shoulder to said lower end, said lower side wall being of a maximum cross sectional area at said shoulder;
II. a brewing holder comprising:
an inside brewing ring including an open upper end with an exterior shoulder spaced axially from said upper ring end forming an annular ring abutment surface, said inside ring including a skirt portion extending axially away from said inside ring shoulder and upper end, said inside ring being sized to receive said closed lower end of said cup for sliding axial movement over said lower wall into snug abutting relation of said open upper end of said inside ring with said second annular exterior abutment surface of said cup;
an outside brewing ring having an open upper end with an interior shoulder extending radially inwardly adjacent said open upper end of said outside brewing ring forming an interior shoulder sized to mate with said exterior shoulder abutment surface and said outside ring including a skirt extending axially downwardly from said inside ring shoulder, said outside ring being sized to receive the closed lower end of said cup and said inside brewing ring skirt with the interior shoulder in snug abutting relation with the exterior shoulder of said inside brewing ring,
said brewing filter holder being adapted to be nestled about said cup with the open upper end of said outside ring in abutting relation with the exterior shoulder of said cup for forming and shaping a pliable filter paper to conform generally to the shape of the exterior of said lower cup wall and said inside ring being adapted to captivate the filter paper in the formed and shaped configuration when the outside ring is about the cup and paper and the interior shoulder of the outside ring is in mating abutting engagement with the annular inside ring abutment surface and said rings are in telescoping relation with one another and with said cup.

2. The device as set forth in claim 1 wherein said skirt of said outside ring is sized to nest within the upper end of said brewing cup and said outside ring includes an exterior shoulder sized to nestle against the first abutment surface of said brewing cup comprising stop means to limit penetration of said brewing filter holder into said open upper end of said brewing cup for suspending filter paper within the cup in spaced relation from the closed lower end of said cup.

3. The device as set forth in claim 1 wherein gripping means are provided on the exterior of said outside brewing ring adjacent said open end for inserting and removing said brewing filter holder from said cup.

4. The device as set forth in claim 3 wherein said gripping means comprises a radially outwardly extending portion about the open upper end of said outside ring.

5. The device as set forth in claim 4 wherein said radially extending portion comprises a radially outwardly extending flange.

6. The device as set forth in claim 4 wherein said radially extending portion includes a radially extending holder arm.

7. The device as set forth in claim 4 wherein said radially outwardly extending portion includes a radially extending holder arm.

8. The device as set forth in claim 1 wherein said brewing cup is a standard size cup.

9. The device as set forth in claim 1 wherein said lower wall of said brewing cup is circular in cross section.

10. The device as set forth in claim 1 wherein said lower side wall of said cup is generally inverted truncated cone-shaped.

11. The device as set forth in claim 1 wherein said inside ring and said outside ring each include an axially extending lip, the axially extending lip of said inside ring being sized to telescopically overlay the cup between said first annular exterior abutment surface and said rim adjacent said cup shoulder and said lip of said inside ring is adapted to overlay the skirt of said inside ring.

* * * * *